March 20, 1945.    A. E. LORCH    2,371,634
PRODUCTION OF BUTADIENE
Filed May 6, 1943
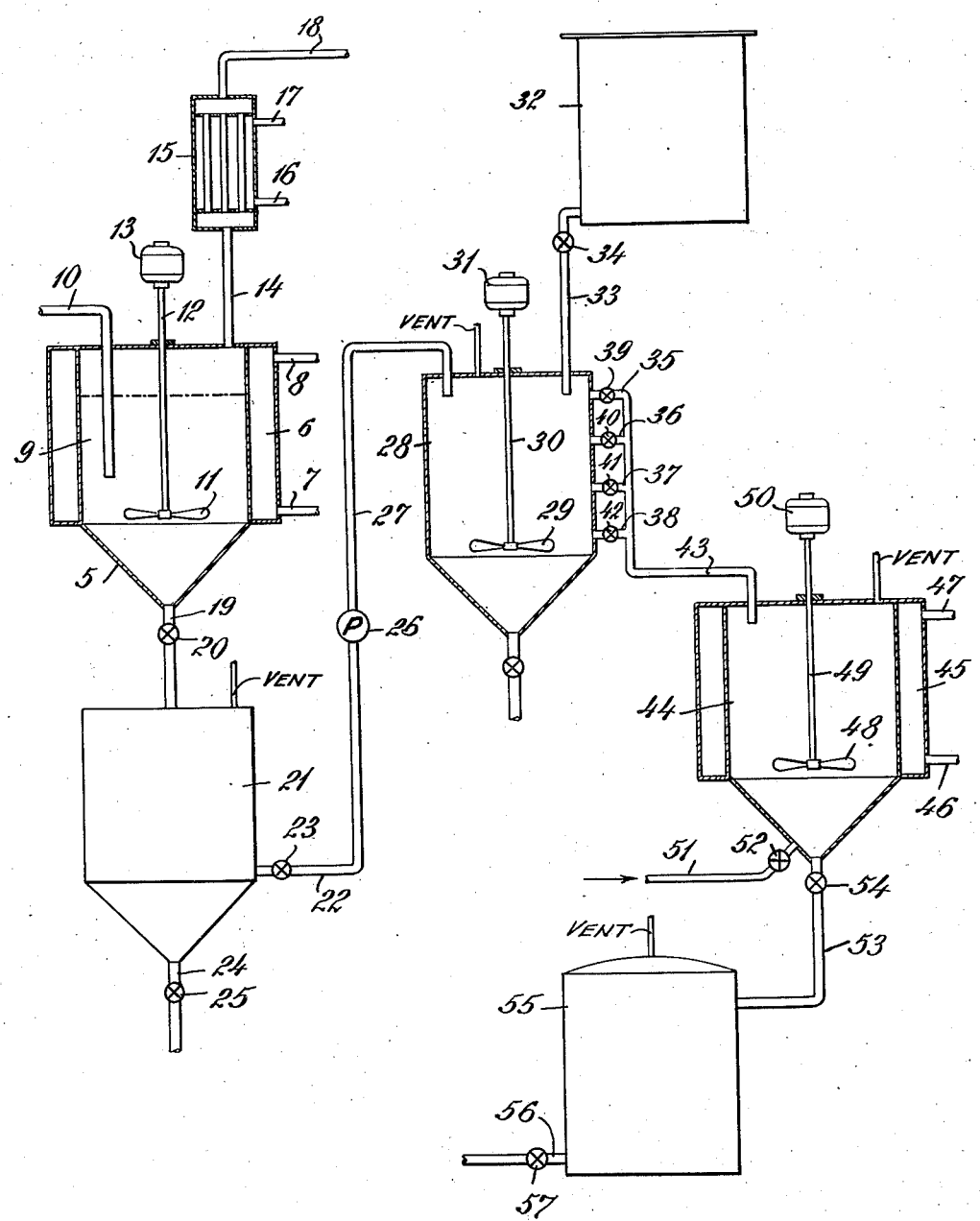
INVENTOR.
Arthur E. Lorch
BY
Pennie Davis Marvin & Edmonds
ATTORNEYS Patented Mar. 20, 1945

2,371,634

UNITED STATES PATENT OFFICE 2,371,634

PRODUCTION OF BUTADIENE

Arthur E. Lorch, Tenafly, N. J., assignor to Air Reduction Company, Incorporated, New York, N. Y., a corporation of New York Application May 6, 1943, Serial No. 485,853

1 Claim. (Cl. 260—681)

This invention relates to the production of 1,3-butadiene from 1,3-butylene glycol and particularly to improvements affording a commercially practicable procedure for the economical recovery of the desired product.

In an application Ser. No. 477,939, filed March 4, 1943, I described a method of producing butadiene by heating 1,3-butylene glycol in relatively low concentrations in an inert liquid including a dehydration catalyst, and in the absence of substantial amounts of water in the liquid phase. The procedure requires the maintenance of a body of a suitable liquid at a temperature favorable to the reaction, that is, within the range of 220° to 350° C., the preferred range being from 260° to 285° C. The catalyst may be dissolved or suspended in the liquid. The glycol is introduced at substantially the rate at which conversion to butadiene occurs, so that no substantial amount of glycol remains at any time in the liquid. Suitable liquids for use in the method include diphenyl ethane, hexaethyl benzene, benzyl ether, a mixture of diphenyl and diphenyl oxide known as "Dowtherm," a refined petroleum product known as "Nujol," Texas Co. #531 wash oil, a topped fuel oil having a boiling point of 260°–270° C., Bunker C oil and a higher alcohol known to the trade as "cyclic $C_{18}$ alcohol." The liquid selected with the dissolved or suspended catalyst may be heated to the desired temperature by means of a jacket through which a heating liquid such as "Dowtherm" is circulated. It is agitated preferably to ensure adequate contact between the glycol and the catalyst.

As the catalyst, I prefer to employ "ammonium phosphate." The term "ammonium phosphate" is employed as a general designation of the tri, di and mono ammonium phosphates or mixtures of these salts. It is employed also to include decomposition products of these phosphates which are subject to modification when subjected to temperatures such as those employed in the method. The precise composition of the resulting salt or salts in the catalyst mass at the temperature maintained cannot be determined accurately. Any of the phosphates mentioned or the resulting products are active catalysts for the reaction. "Ammonium phosphate" is markedly superior to the phosphate catalysts which have been mentioned heretofore in the literature concerning dehydration of 1 3-butylene glycol. However, other catalysts may be employed, the present invention being directed to an improvement in the effective operation of active catalysts for the dehydration of 1,3-butylene glycol.

In the operation of the method as described, the liquid carrier for the catalyst becomes, as the result of continued operation, fouled or contaminated with compounds the exact composition of which is unknown. The introduction of these compounds results in a gradual reduction of the effectiveness of the catalyst and consequently the liquid carrier must be removed at intervals from the reactor. It may be discarded, but considerable expense is thereby entailed, and it is desirable to purify and return the liquid carrier for further use. The liquid carrier can be purified by vacuum distillation or a combination of steam distillation with vacuum distillation. This, however, involves the use of equipment designed to operate under high vacuum. Such equipment is expensive to maintain and operate and the cost of operation would probably exceed the value of the liquid treated.

It is the object of the present invention to afford a simple and effective method whereby the carrier liquid may be purified at relatively slight expense and returned for re-use in the dehydration of 1,3-butylene glycol.

Other objects and advantages of the invention will be apparent as it is better understood by reference to the following specification and accompanying drawing, which illustrates apparatus adapted for the practice of the invention. It will be understood that other types of apparatus may be employed.

I have discovered that the carrier liquid employed in the procedure described in my application Ser. No. 477,939 may be purified and thus made suitable for reuse in the method by a relatively simple procedure involving the treatment of the liquid, after separation of the catalyst therefrom, with sulphuric acid to separate a sludge containing most of the impurities and subsequent treatment of the liquid at an elevated temperature, for example, about 300° C., with an inert gas such as carbon dioxide, nitrogen or steam. As the result of this treatment, the impurities accumulated in the carrier liquid are separated. The liquid can be returned then to the reactor with suitable additions of the catalyst. The removal of the impurities from the liquid carrier restores its initial effectiveness in the method, affording substantially the same yield of butadiene as in the operation involving the use of fresh liquid.

The strength of the sulphuric acid used may be varied over a considerable range. Ordinary concentrated sulphuric acid of commerce, containing about 98% by weight sulphuric acid, has been used satisfactorily, and solutions containing 50% by weight of sulphuric acid are usable, although somewhat more time may be required for the reaction between the acid and the liquid carrier. It is preferable to use the lowest strength of sulphuric acid which will purify the fouled liquid within a reasonable length of time, as higher concentrations of sulphuric acid cause the formation of larger amounts of those compounds which require removal by heating in the presence of an inert gas.

The proportion of sulphuric acid employed will likewise vary, depending upon the condition of the fouled liquid carrier. Usually about 10 parts by volume of 75% by weight sulphuric acid are added to 100 parts by volume of the fouled liquid. More or less sulphuric acid may be used, depending upon the strength thereof. The required proportions to obtain the desired effect most economically can be determined readily by simple tests.

In the operation, the sulphuric acid may be added directly to the fouled liquid. It is sometimes advantageous to first emulsify the acid with a portion of fresh carrier liquid, that is liquid which has not been previously used in the dehydration procedure. However, this operation is optional and not essential to the invention.

The procedure will be better understood by reference to the drawing, in which 5 indicates a reactor having a jacket 6 through which a suitable liquid such as "Dowtherm" may be circulated by means of pipes 7 and 8 to maintain the desired temperature of the dehydration reaction. The reactor 5 is partially filled with a body 9 of the liquid carrier carrying the catalyst suspended therein. 1,3-butylene glycol is introduced through a pipe 10 and delivered beneath the surface of the body of liquid 9 which is agitated vigorously by means of an agitator 11 on a shaft 12 driven from any suitable source of power such as a motor 13. Butadiene formed, together with unreacted and partially reacted glycol and possibly some distillate from the liquid carrier, is delivered through a pipe 14 to a condenser 15 through which cooling water is circulated by pipes 16 and 17. The unreacted glycol and any vapors of the carrier liquid are condensed and returned through the pipe 14. The butadiene and partially reacted glycol are delivered through a pipe 18 for further treatment in accordance with the method described in my application Serial No. 477,939.

When the carrier liquid has become contaminated by continued use, it is delivered, together with the suspended catalyst, to a pipe 19 controlled by a valve 20 into a settling tank 21. The catalyst readily separates on standing, and the liquid carrier may be withdrawn through a pipe 22 controlled by a valve 23. The catalyst is removed from the bottom through a pipe 24 controlled by a valve 25 and may be subjected to any suitable treatment for revivification. The liquid is delivered by a pump 26 and pipe 27 to a tank 28 provided with an agitator 29 on a shaft 30 driven from any suitable source of power such as a motor 31. Sulphuric acid is delivered from a storage tank 32 through a pipe 33 controlled by a valve 34 in the proper proportions to the liquid in the tank 28 and is agitated with the liquid for a period sufficient to effect the desired reaction. Thereupon the agitator 29 is stopped and the sludge is permitted to settle in the bottom of the tank 28.

The liquid may be decanted through a series of pipes 35, 36, 37 and 38, controlled by valves 39, 40, 41 and 42 and delivered by a pipe 43 to a tank 44 having a jacket 45 through which a heating liquid such as "Dowtherm" is circulated by pipes 46 and 47. The temperature of the liquid is thus raised to approximately 300° C. An agitator 48 on a shaft 49 is adapted to be driven from a suitable source of power such as a motor 50. While the liquid is agitated, an inert gas such as carbon dioxide, nitrogen or steam is introduced through a pipe 51 controlled by a valve 52, and the operation is continued until contaminating materials in the liquid have been removed. It may be withdrawn then through a pipe 53 controlled by a valve 54, and after addition of a suitable proportion of the catalyst it is ready for reuse in the reactor 5. A suitable storage tank 55 may be connected to the pipe 53, and the liquid may be withdrawn as required through a pipe 56 controlled by a valve 57.

As an example of the invention, Texas Co. #531 wash oil was used with a catalyst composed of "ammonium phosphate" supported on "Filtercel," in the liquid phase method of dehydration of 1,3-butylene glycol as described in my application Ser. No. 477,939. The method produced a yield of 87% of butadiene. After continued use, the oil became fouled and even when fresh catalyst was used with the oil the yield of butadiene was reduced to 81%. The fouled oil was subjected to the treatment described herein. After the catalyst had been removed by settling, the oil was agitated with ten parts by volume of 75% by weight sulphuric acid to 100 parts by volume of the oil at room temperature. On standing, the sludge settled and the upper oil layer was removed by decantation and heated to about 300° C. for a period of approximately two hours while a stream of nitrogen was introduced. The oil, after this treatment, was recombined with the catalyst and reutilized in the dehydration reaction. The yield of butadiene was 86.5%, substantially the same performance as that obtained with fresh oil.

The method as described avoids the loss of the carrier liquid and thereby reduces the cost of maintaining the dehydration reaction. The necessary equipment is simple and inexpensive, and the procedure can be carried out in such a manner as to afford a constant supply of purified carrier liquid so that the dehydration of 1,3-butylene glycol may be conducted in a substantially continuous manner.

Various changes may be made in the procedure and in the details of the apparatus used without departing from the invention or sacrificing the advantages thereof.

I claim:

The method of producing 1,3-butadiene from 1,3-butylene glycol which comprises subjecting the 1,3-butylene glycol to the action of a solid dehydration catalyst suspended in a heated liquid carrier until the liquid carrier is contaminated, separating the solid catalyst from the liquid carrier, agitating the liquid carrier with sulphuric acid to produce a sludge, separating the liquid from the sludge and subjecting the liquid at a temperature of approximately 300° C. to the action of an inert gas, adding the catalyst to the resulting liquid and returning it for further use in the dehydration of 1,3-butylene glycol.

ARTHUR E. LORCH.